(12) United States Patent
Nagai et al.

(10) Patent No.: US 6,484,486 B2
(45) Date of Patent: Nov. 26, 2002

(54) GRASS CUTTING MACHINE WITH MOWER UNIT

(75) Inventors: Hiroki Nagai, Izumiotsu (JP);
Nobuyuki Yamashita, Izumi (JP);
Mikio Yuki, Kawachinagano (JP);
Hiroshi Oshima, Osaka (JP);
Masatake Murakawa, Osaka (JP);
Hiroshi Kawabata, Sakai (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/997,618

(22) Filed: Nov. 29, 2001

(65) Prior Publication Data

US 2002/0083694 A1 Jul. 4, 2002

Related U.S. Application Data

(63) Continuation of application No. 09/391,579, filed on Sep. 8, 1999.

(30) Foreign Application Priority Data

Mar. 17, 1999 (JP) .............................................. 11-71924

(51) Int. Cl.⁷ .............................................. A01D 19/00
(52) U.S. Cl. .............................. 56/16.8; 56/255; 56/295
(58) Field of Search .............................. 56/16.8, 16.6, 56/202, 13.3, 320.2, 320.1, 13.5, 13.6, 13.7, 13.8, DIG. 22

(56) References Cited

U.S. PATENT DOCUMENTS

| | | | | |
|---|---|---|---|---|
| 3,969,876 A | * | 7/1976 | Turos .......................... | 56/202 |
| 4,335,567 A | | 6/1982 | Comer ......................... | 56/12.7 |
| 4,364,221 A | | 12/1982 | Wixon ......................... | 56/13.6 |
| 4,958,484 A | | 9/1990 | Busboom ..................... | 56/255 |
| 5,769,747 A | | 6/1998 | Kuhn et al. ................. | 474/135 |
| 6,038,840 A | | 3/2000 | Ishimori et al. ............. | 56/13.3 |
| 6,360,517 B1 | * | 3/2002 | Ishimori et al. ........... | 56/320.1 |

FOREIGN PATENT DOCUMENTS

| | | | | |
|---|---|---|---|---|
| EP | 0532068 | 3/1993 | .......... | A01D/34/70 |
| EP | 0619065 | 10/1994 | .......... | A01D/34/70 |
| EP | 0856245 | 8/1998 | .......... | A01D/34/76 |
| FR | 2762185 | 10/1998 | .......... | A01D/34/70 |
| JP | 03035715 | 2/1991 | .......... | A01D/34/66 |

* cited by examiner

*Primary Examiner*—Robert E. Pezzuto
*Assistant Examiner*—Árpád Fábián Kovács
(74) *Attorney, Agent, or Firm*—Webb Ziesenheim Logsdon Orkin & Hanson, P.C.

(57) ABSTRACT

A mower unit of grass cutting machine has at least two blades. The left blade is rotatable clockwise, while the right blade is rotatable counterclockwise. A grass discharge passage is formed between the two blades. An endless rotational belt for transmitting drive to the two blades is offset forwardly in a region between the blades, thereby forming, between the blades, a space without the endless rotational belt. The grass discharge passage has an upper surface inclined rearwardly and upwardly to extend from a position forwardly of a pair of pulleys corresponding to the two blades.

2 Claims, 15 Drawing Sheets

PRIOR ART

PRIOR ART

GRASS CUTTING MACHINE WITH MOWER UNIT

CROSS-REFERENCE TO RELATED APPLICATION

This application is a continuation of U.S. patent application Ser. No. 09/391,579 filed Sep. 8, 1999, entitled "Grass Cutting Machine with Mower Unit", which corresponds to Japanese Application No. 11-071924, filed Mar. 17, 1999.

BACKGROUND OF THE INVENTION

1. Field of the Invention

This invention relates to an improvement in the construction of a mower unit for discharging grass clippings.

2. Description of the Related Art

In a conventional mower unit, as shown in FIGS. 14 and 15, an endless rotational belt 29 has a moving path including a straight path portion L1 between pulleys 26 and 28. A deck plate 17 defines an upper surface 40a of a grass discharge passage 40 inclined upward and rearward from adjacent a position over the straight path portion L1. The rear end of the upper surface 40a is located above the endless rotational belt 29. Thus, the upper surface 40a of grass discharge passage 40 defines a ceiling wall 41 not interfering with the rear moving path portion L1. Grass clippings cut by rotary blades 16 are carried along the grass discharge passage 40 by airflows generated by rotation of the rotary blades 16, to be discharged in batches from a grass discharge opening 20 at the rear end of the grass discharge passage 40.

It may be necessary for the grass clippings discharged in batches from the grass discharge opening 20 to be blown to a higher level than the discharge opening 20. In this case, the discharge opening 20 should preferably have an upper edge 20a located at an elevated level. In the above construction, the upper surface 40a of grass discharge passage 40 must extend with a steep gradient in order to raise the upper edge 20a of discharge opening 20 while maintaining the ceiling wall 41 of grass discharge passage 40 out of interference with the endless rotational belt 29. However, the steeper the upper surface 40a of grass discharge passage 40 is, the greater is the chance of airflows stalling while moving along the upper surface 40a. Especially, damp grass clippings carried by the airflows through the grass discharge passage 40 tend to adhere to the upper surface 40a of the discharge passage 40 to impair transporting efficiency.

SUMMARY OF THE INVENTION

The object of this invention is to provide a mower unit which overcomes the disadvantage noted above, and a grass cutting machine having such a mower unit.

The above object is fulfilled, according to this invention, by a mower unit comprising a first blade rotatable clockwise in plan view, a first pulley rotatable with the first blade to drive the first blade, a second blade disposed rightward from the first blade and rotatable counterclockwise, the second blade being level with or displaced from the first blade in a fore and aft direction, a second pulley rotatable with the second blade to drive the second blade, an endless rotational belt for transmitting drive at least between the first pulley and the second pulley, and a grass discharge passage disposed between rotary shafts of the first pulley and second pulley and having an inclined upper surface. A portion of the endless rotational belt extending between the first pulley and the second pulley is offset forwardly, in the fore and aft direction, of a phantom line extending between the rotary shafts of the first pulley and second pulley. The upper surface of the grass discharge passage begins to incline in a position forwardly of the phantom line.

In the above construction, the endless rotational belt is offset forward, and the upper surface of the grass discharge passage has a ceiling wall thereof which may be inclined from a forward position within a range not interfering with the endless rotational belt.

Thus, in an embodiment of this invention, the upper surface of the grass discharge passage has a rising end located more forwardly than in the conventional mower unit. The rear end of the grass discharge passage is located at a correspondingly elevated plane even where the upper surface extends with the same gradient as in the prior art.

The upper surface of the grass discharge passage may be less steep than in the conventional mower unit. It is also possible to elevate the rear end of the upper surface of the grass discharge passage to a higher level than in the conventional mower unit.

Consequently, while avoiding lowering of the efficiency of transporting grass clippings, the rear end of the upper surface of the upwardly inclined grass discharge passage may be elevated to an increased height.

DETAILED DESCRIPTION OF THE PREFERRED EMBODIMENT

Figure 1:
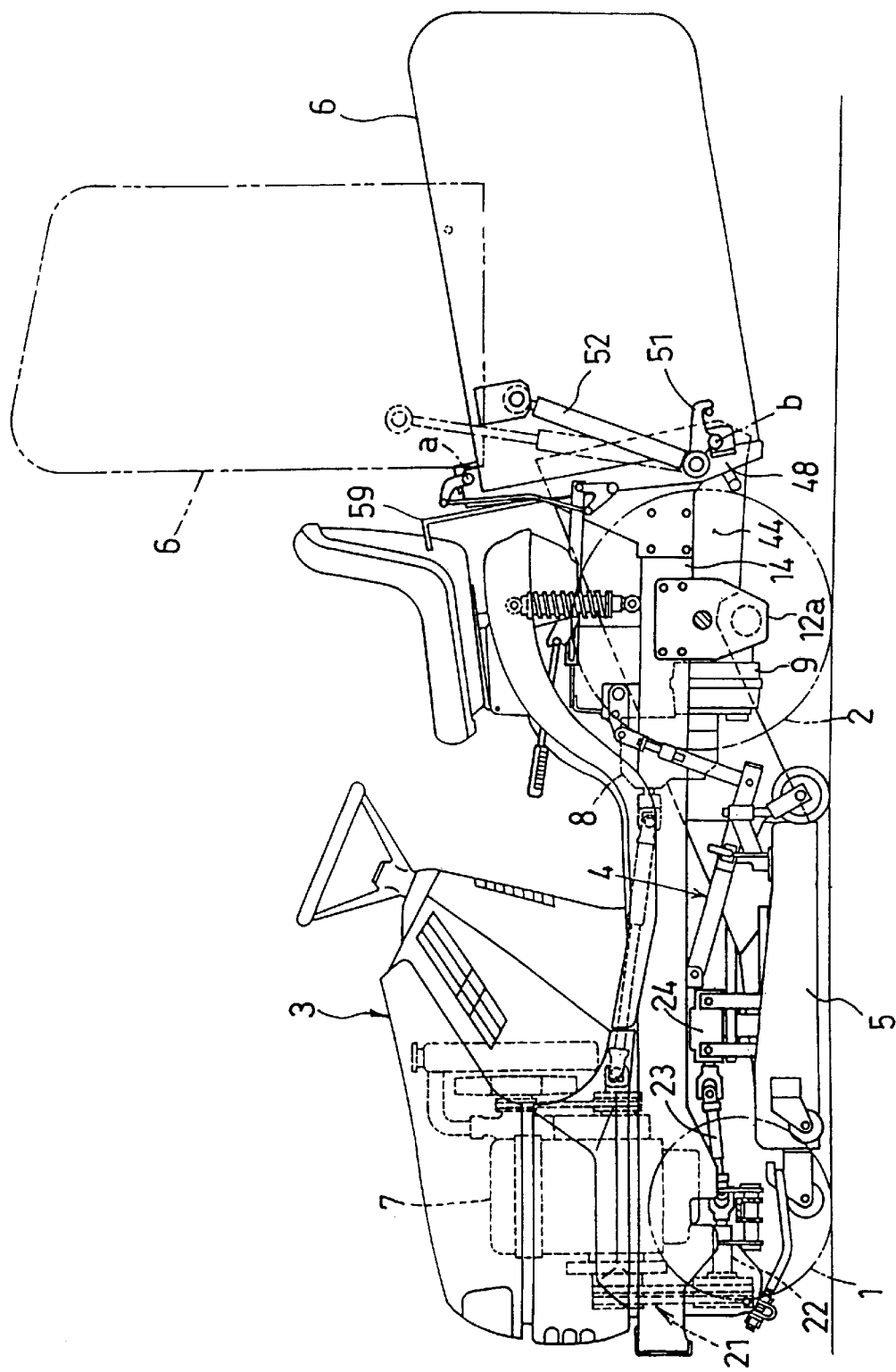
FIG. 1 is a side elevation of a grass cutting machine having a mower unit according to this invention.

A grass cutting machine with a mower unit according to this invention will be described hereinafter with reference to the drawings.

In the following description, the terms fore and aft direction and right and left direction are defined, unless otherwise defined, as the forward, rearward, rightward and leftward directions with reference to the grass cutting machine.

FIGS. 1 through 4 show the entire grass cutting machine. The grass cutting machine includes a vehicle body 3 having front wheels 1 and rear wheels 2. The vehicle body 3 has a mower unit 5 vertically movably suspended therefrom through a link mechanism 4. A grass catcher 6 is coupled to the rear end of the vehicle body 3 to act as a grass collecting device.

An engine 7 is mounted on the front of the vehicle body 3. Output of the engine 7 is transmitted through shafts to a hydrostatic stepless transmission (HST) 8 disposed in a rear position of the vehicle body 3. Varied speed output of the HST 8 undergoes a further change speed by gears in a transmission case 9 and is transmitted to a differential 10. Power taken out of the differential 10 through left and right differential transmission shafts 11a and 11b is reduced in left and right reduction cases 12a and 12b and transmitted to left and right axles 13a and 13b. That is, a pair of axles 13a and 13b are provided for rotatably supporting the rear wheels 2, respectively.

Figure 3:
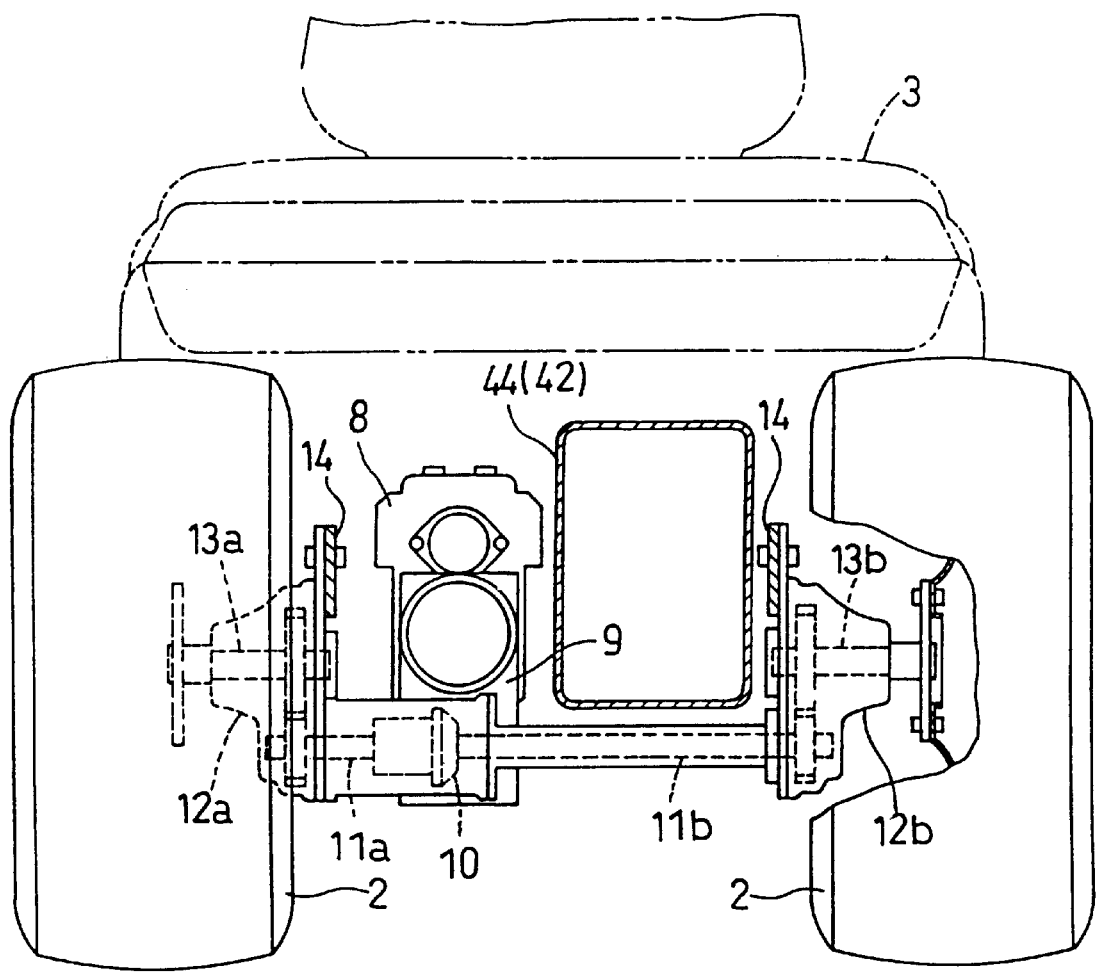
FIG. 3 is a rear view in vertical section of the principal portion of the grass cutting machine.

The transmission case 9 is offset leftward relative to the vehicle body 3. The left reduction case 12a is coupled directly to a side wall of the transmission case 9. The right reduction case 12b is supported directly by a body frame 14 in a position spaced from the transmission case 9. As shown in FIG. 3, a large space is formed between the right differential transmission shaft 11b, transmission case 9 and right reduction case 12b.

The transmission shaft 11b coupled to the pair of axles 13a and 13b for transmitting drive from the engine 7 to the axles 13a and 13b is offset below the axles 13a and 13b to provide a space for a duct 42 described hereinafter.

The duct 42 is offset from a midpoint between the rear wheels 2.

As shown in FIGS. 2 through 6, the mower unit 5 includes a deck 16 opening downward, and three rotary blades 16 juxtaposed in the right and left direction in the deck 15 to be rotatable about vertical axes. The deck 15 includes a deck plate 17 on which the three rotary blades 16 are juxtaposed in the right and left direction, and a vacuum plate 18 attached to a lower surface of the deck plate 17 and extending along rotating tracks R of these rotary blades 16.

An outer wall 19 is formed integrally with and along an outer edge of the deck plate 17. The vacuum plate 18 extends to opposite sides of a grass discharge opening 20 formed in a rear position of the deck 15.

A grass pickup space S is formed between a front wall portion 19a of outer wall 19 and the vacuum plate 18. This space S promotes a spontaneous rise of uncut grass after being forwardly pushed over by a lower edge of the front wall portion 19a.

Figure 2:
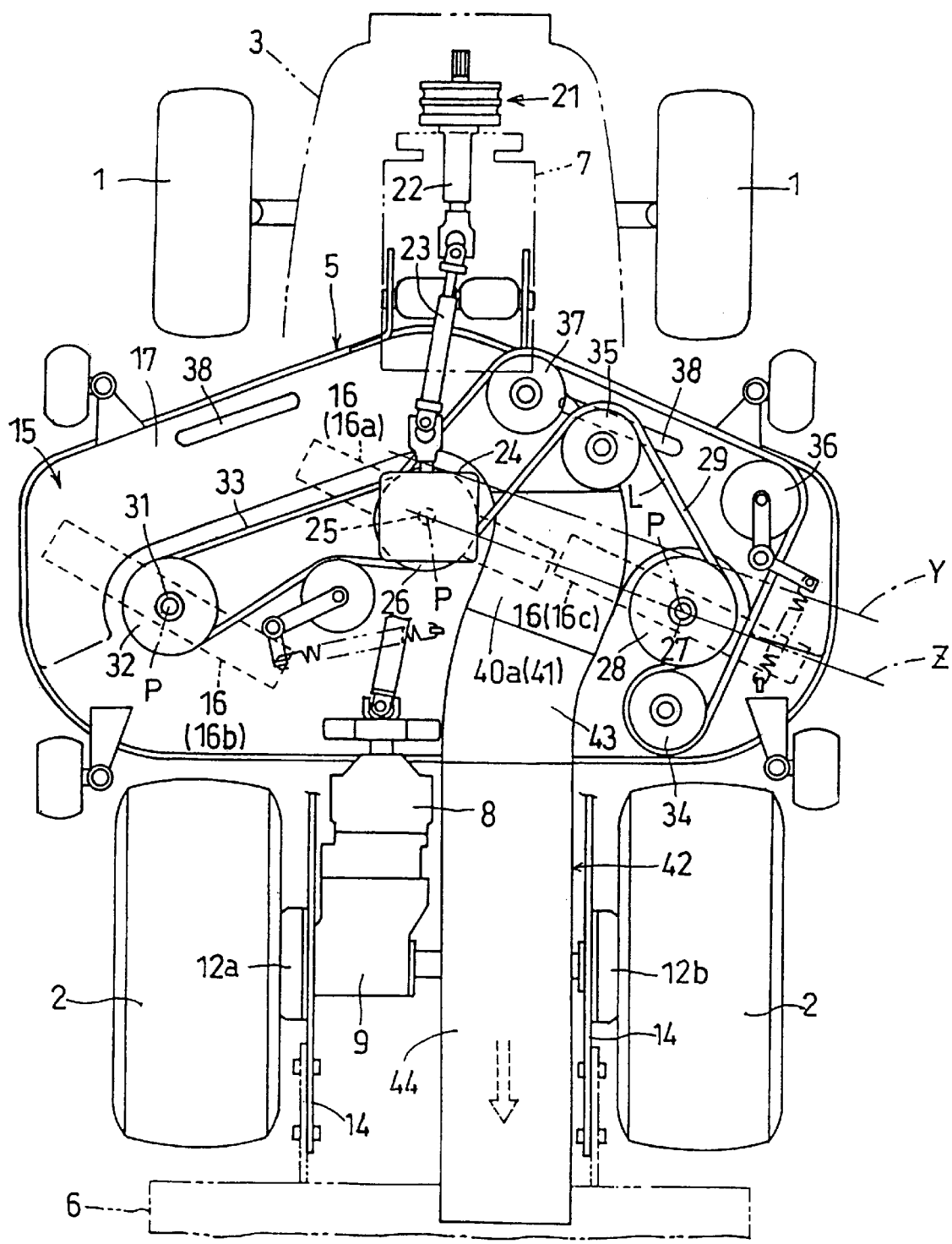
FIG. 2 is a plan view of a principal portion of the grass cutting machine.

A drive system for driving the three rotary blades 16 juxtaposed on the deck plate 17 will be described next. As shown in FIGS. 1 and 2, a PTO shaft 22 operatively connected to the engine 7 through a belt transmission mechanism 21 transmits power through a transmission shaft 23 to an input case 24 disposed above the upper surface of deck plate 17. The central rotary blade (first blade) 16a disposed under the input case 24 is driven directly by a rotary shaft 25 extending from the input case 24.

The central rotary blade 16a and right rotary blade (second blade) 16c are interlocked through a hexagonal belt 29 acting as an endless rotational belt wound around a first drive pulley (first pulley) 26 disposed above the upper surface of deck plate 17 and mounted on the rotary shaft 25 of central rotary blade 16a, and a right driven pulley (second pulley) 28 disposed above the upper surface of deck plate 17 and mounted on a rotary shaft 27 of right rotary blade 16c. The central rotary blade 16a and left rotary blade (third blade) 16b are interlocked through a flat belt 33 wound around a second drive pulley 30 disposed above the upper surface of deck plate 17 and mounted on the rotary shaft 25 of central rotary blade 16a, and a left driven pulley 32 disposed above the upper surface of deck plate 17 and mounted on a rotary shaft 31 of left rotary blade 16b. The first drive pulley 26 and second drive pulley 30 are formed integral with each other.

Figure 4:
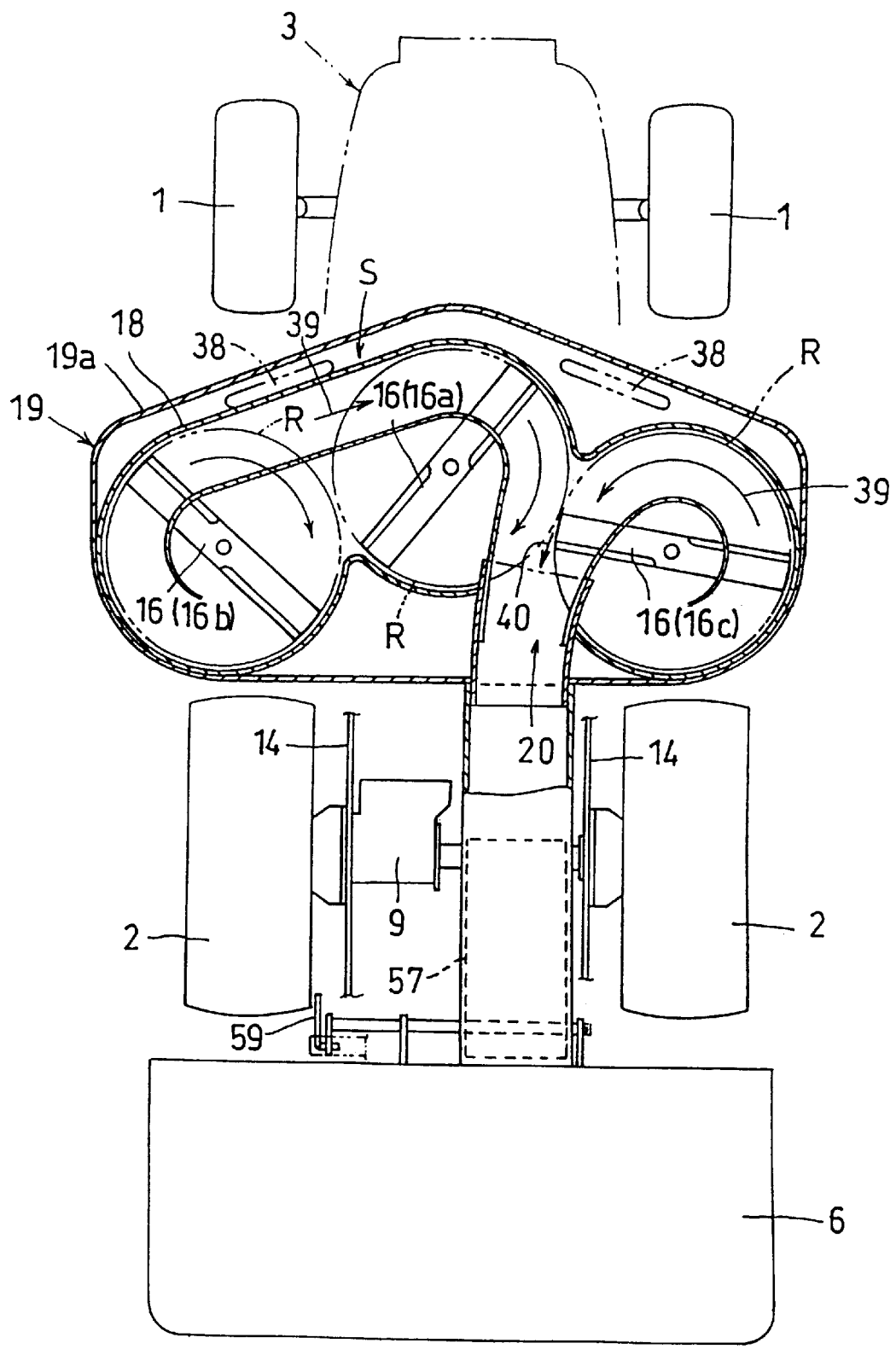
FIG. 4 is a plan view, partly in section, of the principal portion of the grass cutting machine.

As shown in FIG. 4, the central rotary blade (first blade) 16a and left rotary blade (third blade) 16b are rotatable clockwise in plan view, while the right rotary blade (second blade) 16c is rotatable counterclockwise. The right rotary blade (second blade) 16c is displaced rearward relative to the central rotary blade (first blade) 16a at the right side of the latter. That is, the pair of central rotary blade 16a and right rotary blade 16c juxtaposed transversely are rotatable inwardly from front to rear.

The right rotary blade (second blade) 16c disposed at the right side of the central rotary blade (first blade) 16a may be level therewith in the fore and aft direction, or may be displaced forward relative thereto.

The hexagonal belt 29 acting as an endless rotational belt is wound around the first drive pulley 26 and a first idler pulley 34 disposed rearwardly of the right driven pulley 28, with an outer surface of the hexagonal belt 29 wound around the right driven pulley 28. The hexagonal belt 29 is rotatable along a moving path including a path portion L extending between the first drive pulley (first pulley) 26 and right driven pulley (second pulley) 28. With a second idler pulley 35 and a tension pulley 36 juxtaposed right and left along a front edge of deck plate 17, and a third idler pulley 37 disposed forwardly between the first drive pulley 26 and right driven pulley 28, the path portion L is located forwardly of a phantom line Z extending through the rotary shafts 25 and 27 of the first drive pulley 26 and right driven pulley 28. Preferably, the moving path portion L is located forwardly of a common front tangent Y linking the first drive pulley 26 and right driven pulley 28. That is, the moving path portion L between the first drive pulley 26 and right driven pulley 28 is located forwardly of the two pulleys 26 and 28.

It is preferable that at least part of each of the second idler pulley 35, tension pulley 36 and third idler pulley 37 is located forwardly of the phantom line Z. It is more desirable that at least part of each of these pulleys is located forwardly of the common front tangent Y. It is still more desirable that the entirety of each of the second idler pulley 35, tension pulley 36 and third idler pulley 37 is located forwardly of the common front tangent Y.

The above construction provides a belt-free space formed around a middle region of the phantom line Z. As seen from FIGS. 2 and 13, this space extends forwardly of the common front tangent Y.

The construction of mower unit 5 will be described next.

Figure 5:
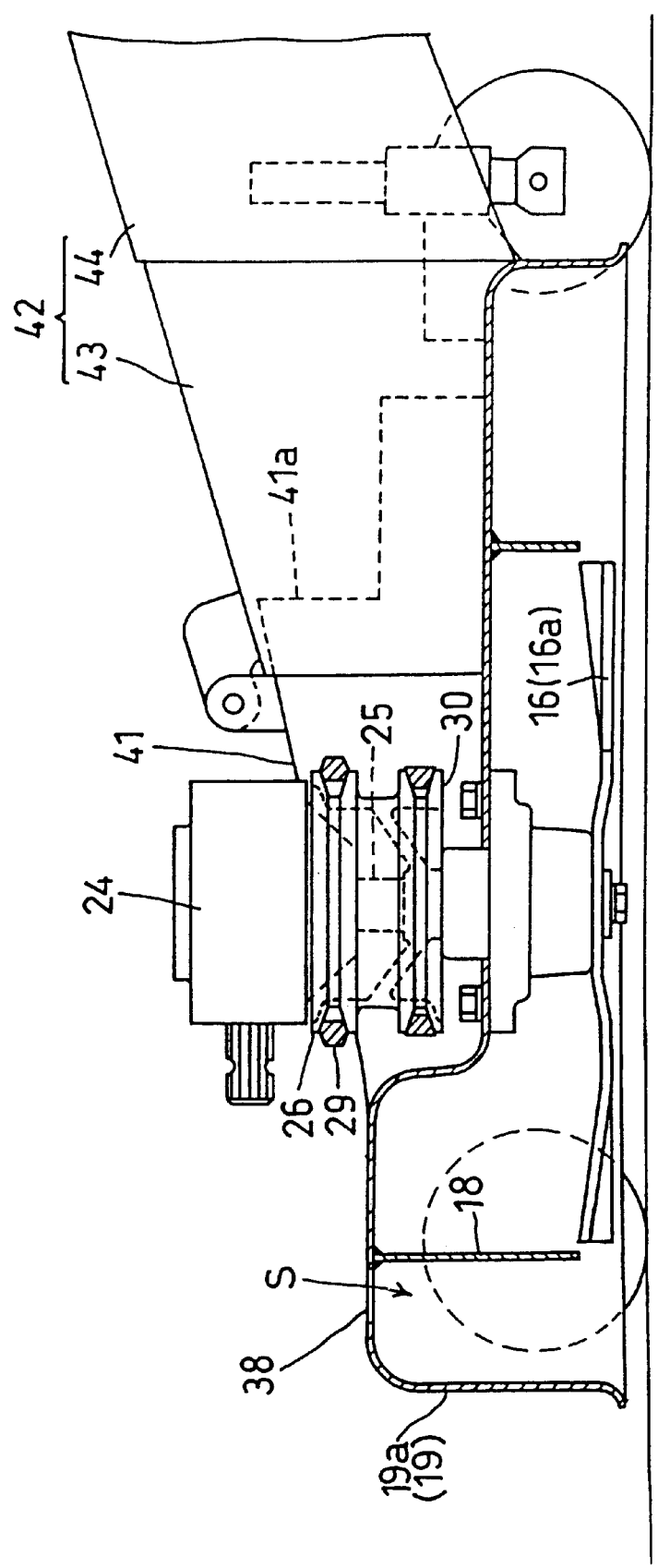
FIG. 5 is a side view in vertical section of the mower unit.
Figure 6:
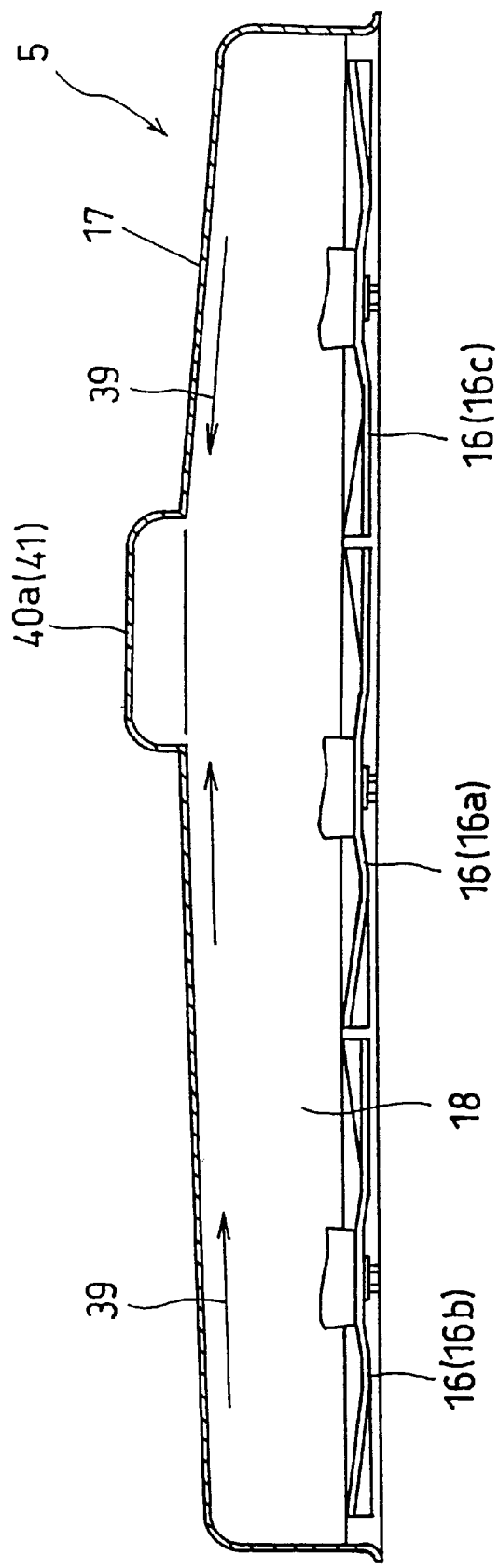
FIG. 6 is a rear view in vertical section of the mower unit.
Figure 7:
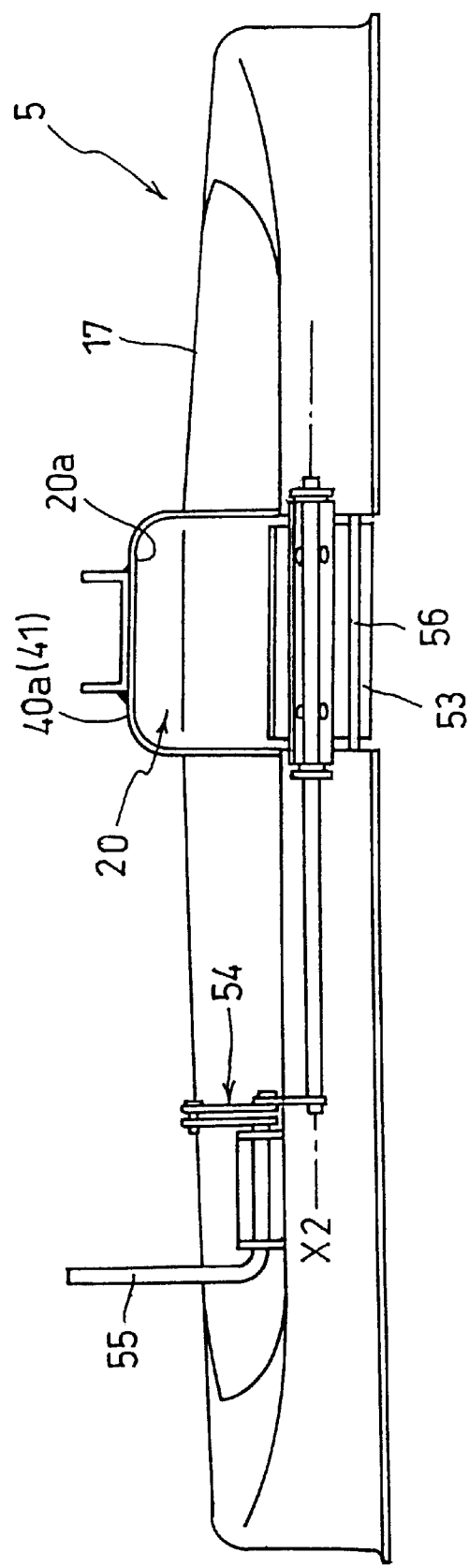
FIG. 7 is a rear view of the mower unit.

As shown in FIG. 5, the vacuum plate 18 has a lower edge thereof located at a higher level above the ground than a cutting height of the rotary blades 16. The outer wall 19 has a lower edge thereof located, throughout its perimeter, at a lower level above the ground than the cutting height of the rotary blades 16. That is, the lower edge of the front wall portion 19a of outer wall 19 is located at a lower level above the ground than the cutting height of the rotary blades 16. In addition, the deck plate 17 has upwardly opening air intakes 38 formed in positions thereof defining the grass pickup space S.

As shown in FIG. 4, the deck 15 defines grass transport passages 39 extending along the vacuum plate 18. The deck plate 17 defines a grass discharge passage 40 disposed between rotational axes P of the central rotary blade 16a and right rotary blade 16c and continuous with the grass transport passages 39, for discharging grass clippings rearwardly and upwardly. The grass discharge passage 40 has a rear end thereof opening between an upper rear surface of deck plate 17 and a rear wall portion of outer wall 19, thereby defining a grass discharge opening 20. The grass discharge passage 40 is curved in an arcuate form, in plan view, to approach a midpoint transversely of the deck 15 as it extends toward the grass discharge opening 20. Consequently, the grass discharge opening 20 is located directly rearwardly of the central rotary blade 16a.

As shown in FIGS. 2 and 5, with rotation of the rotary blades 16, grass clippings cut by the rotary blades 16 are carried along the grass transport passages 40 and collected in a forward region of the grass discharge passage 40 by airflows generated by the rotary blades 16. Thereafter the grass clippings are carried by the airflows along the grass discharge passage 40 to be discharged in batches from the grass discharge opening 20 at the rear end of the grass discharge passage 40.

In regions opposed to right and left portions and front portions of the grass transport passages 39, including the grass pickup space S, the deck plate 17 is shaped to bulge gently upward from right and left sides to reach its peak adjacent the forward region of the grass discharge passage 40. A ceiling wall 41 defining an upper surface 40a of grass discharge passage 40 extends rearward and upward from the peak corresponding to the grass transport passages 39. The upper surface 40a of the grass discharge passage 40 is sloped so that the rear end 41a of the upper surface 40a is disposed above the winding height of the hexagonal belt 29.

With the ceiling wall 41 not interfering with the hexagonal belt 29, the upper surface 40a of grass discharge passage 40 extends rearward and upward from a position immediately rearwardly of the third idler pulley 37 and forwardly of the common front tangent Y linking the first drive pulley 26 and right driven pulley 28, as curved from the peak of the upper surface of the grass transport passages 39 disposed forwardly of the grass discharge passage 40.

The moving path portion L between the first drive pulley 26 and right driven pulley 28 along which the hexagonal belt 29 is movable is disposed forwardly of these pulleys 26 and 28. The upper surface 40a of grass discharge passage 40 extends upward from a position forwardly of the pulleys 26 and 28. Compared, for example, with a case where the upper surface 40a of grass discharge passage 40 extends upward, with the same gradient, from between the pulleys 26 and 28, the grass discharge opening 20 at the rear end of grass discharge passage 40 has an upper opening edge 20a located at an increased height.

A structure for transporting grass clippings as entrained by airflows from the mower unit 5 to the grass catcher 6 will be described next. As shown in FIGS. 2 through 5 and 8 through 11, the duct 42 mentioned hereinbefore is disposed in the space formed at the right side below the vehicle body 3 for guiding grass clippings discharged with airflows from the grass discharge opening 20 to the grass catcher 6. The duct 42 includes a front duct 43 coupled to the grass discharge opening 20 to be vertically pivotable about a transverse pivotal axis X1 for rearwardly and upwardly guiding the grass clippings discharged with airflows from the grass discharge opening 20, and a rear duct 44 extending through the space between transmission case 9 and right reduction case 12b for guiding the grass clippings having been guided by the front duct 43 toward to the grass catcher 6.

Figure 11:
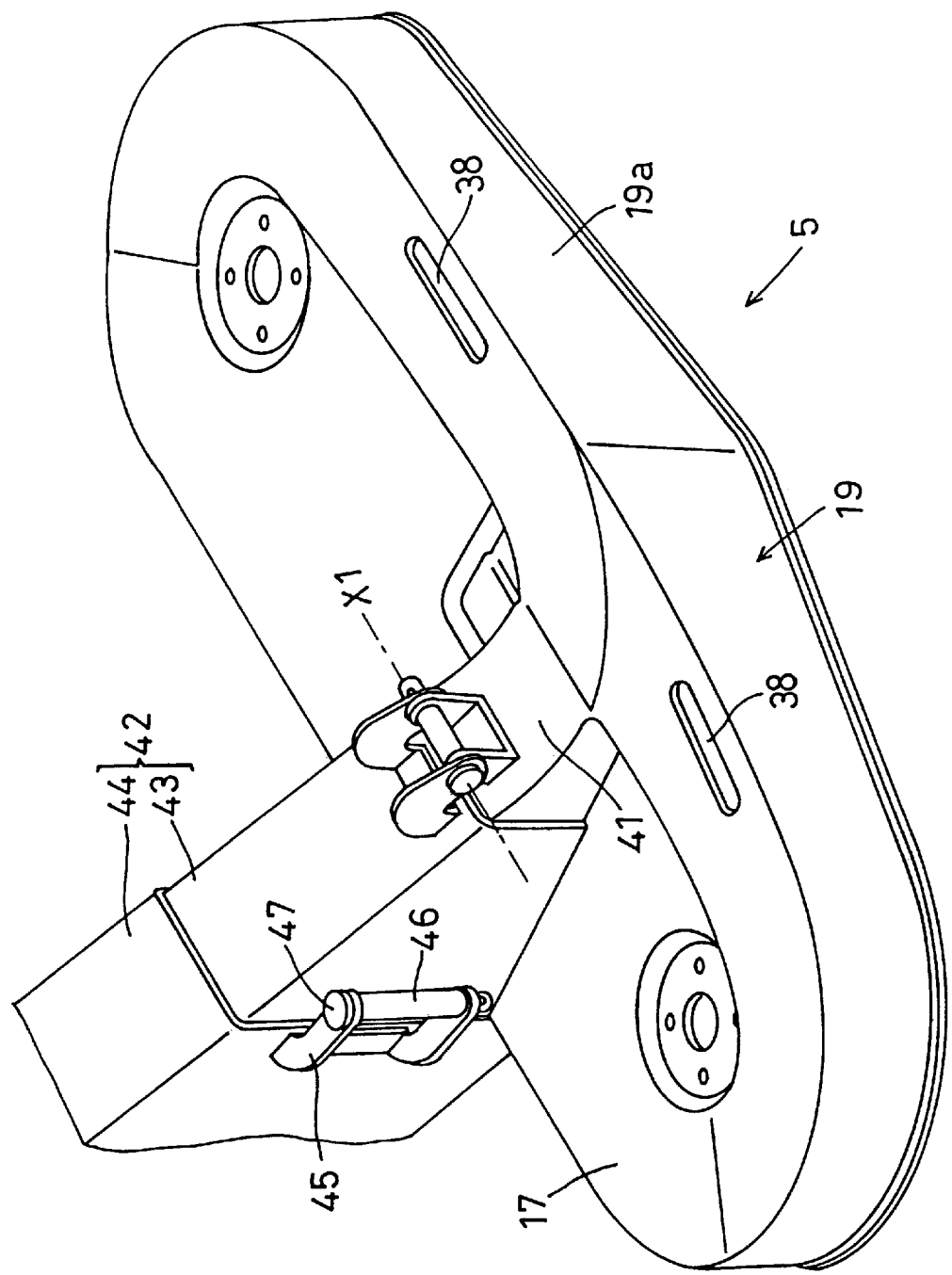
FIG. 11 is a perspective view of the deck with a duct attached thereto.

As shown in FIG. 11, the rear duct 44 is coupled to the rear end of front duct 43 so as to surround the rear end. The front duct 43 and rear duct 44 are interconnected through a coupling device. This coupling device includes a stay 45 attached to a right side, remote from the transmission case 9, at the forward end of rear duct 44, a cylindrical collar 46 disposed on a right side at the rear end of front duct 43, and a pin 47 extending through the stay 45 and collar 46. The upper surface of front duct 43 and the upper surface of rear duct 44 extend substantially straight rearward and upward in side view.

The rear duct 44 is formed straight in plan view to extend in the fore and aft direction, and has a bottom arched in side view. The top of the arch is disposed over and adjacent the right differential transmission shaft 11b.

Figure 12:
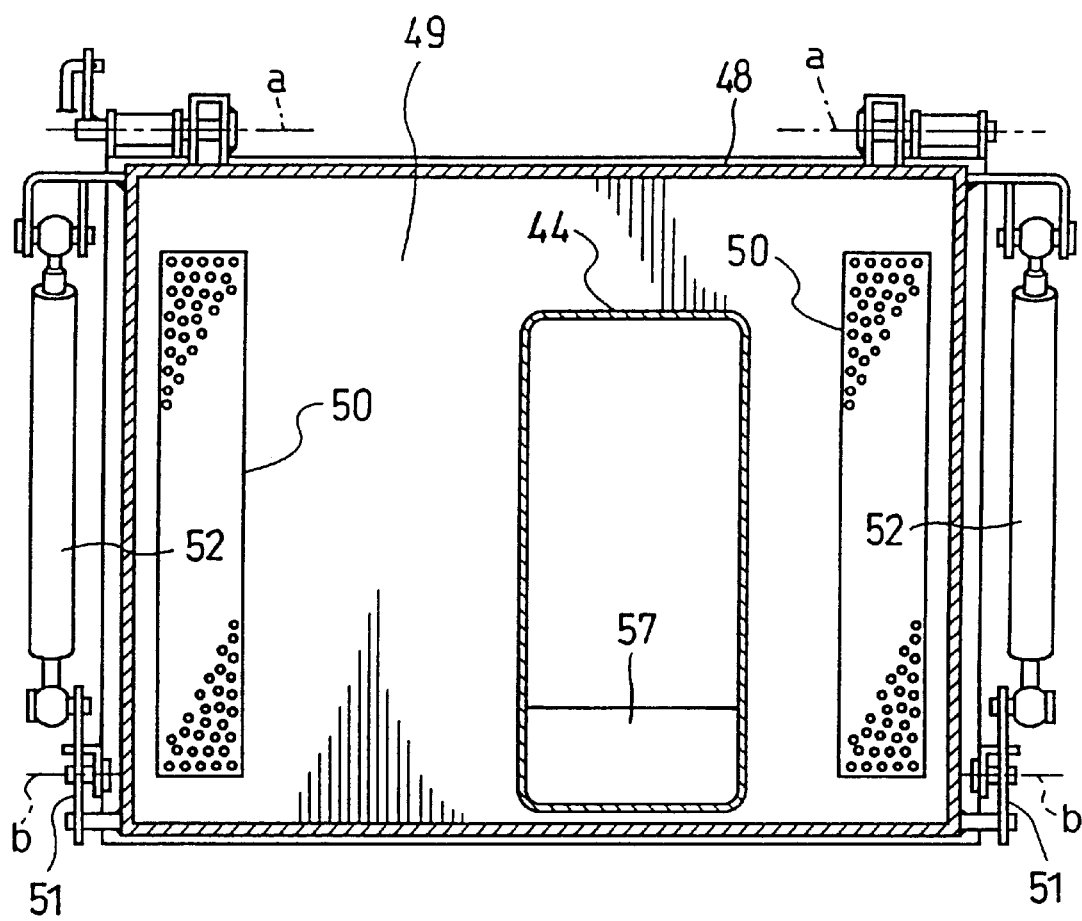
FIG. 12 is a front view in vertical section showing a grass catcher mounting structure.

As shown in FIG. 12, the grass catcher 6 is in the form of a permeable container with a fully open front end. The grass catcher 6 is connected to a support frame 48 erected at the rear end of body frame 14, to be vertically swingable about an upper pivotal axis a. The support frame 48 includes a wall 49 for closing the front opening of the grass catcher 6 in a lowered position. The rear end of the rear duct 44 projects into a transversely intermediate portion of the wall 49. The wall 49 has air vents 50 formed in right and left positions thereof.

As shown in FIGS. 1 and 12, the support frame 48 has support brackets 51 attached to right and left lower positions thereof to be pivotable about a pivotal axis b. A hydraulic cylinder 52 is pivotally connected to and extends between each support bracket 51 and an upper front position of the grass catcher 6. When the hydraulic cylinders 52 are contracted, the grass catcher 6 is lowered to a grass collecting position with the front end thereof received by the support frame 48. When the hydraulic cylinders 52 are extended, the grass catcher 6 is swung upward to a discharge position with the front opening directed downward.

The front duct 43 is coupled to be vertically pivotable about the transverse pivotal axis X1 as noted hereinbefore. Thus, even when the mower unit 5 is raised or lowered through the link mechanism 4, the upper surfaces of front duct 43 and rear duct 44 may be maintained in the substantially straight state continuously extending rearward and upward in side view to produce smooth airflows through the duct 42. Grass clippings may be transported toward the grass catcher 6 efficiently despite variations in the cutting height of the rotary blades 16. The rear duct 44 extending through the space between the transmission case 9 and right reduction case 12b is formed straight. Thus, with the rear end of rear duct 44 projecting into the transversely intermediate portion of the wall 49 closing the front opening of the grass catcher 6 (FIG. 12), the forward end of rear duct 44 may easily be fitted on the rear end of front duct 43. This construction facilitates attachment of the rear duct 44.

Figure 8:
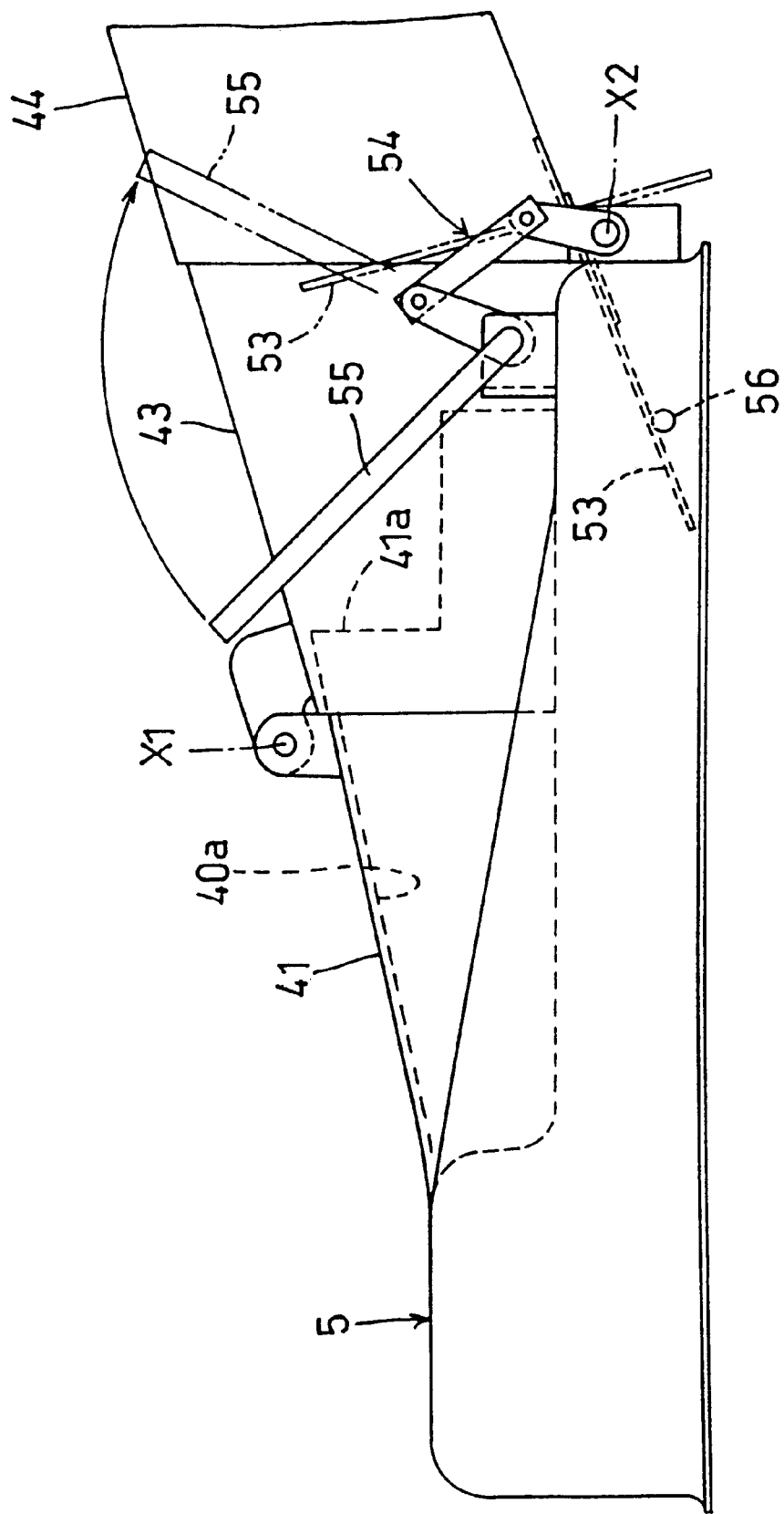
FIG. 8 is a side view of the mower unit.
Figure 9:
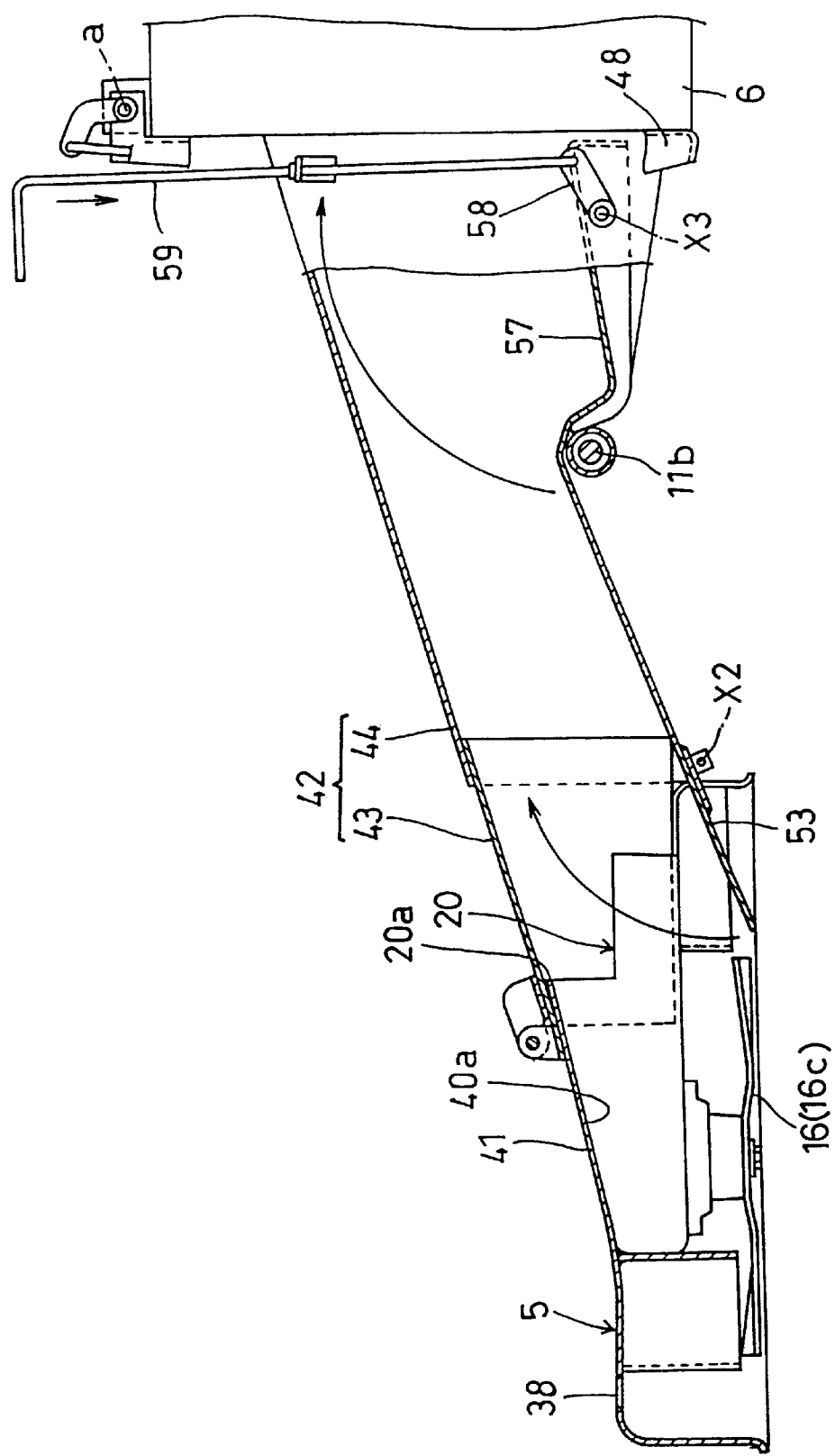
FIG. 9 is a side view in vertical section showing a grass transporting structure.
Figure 10:
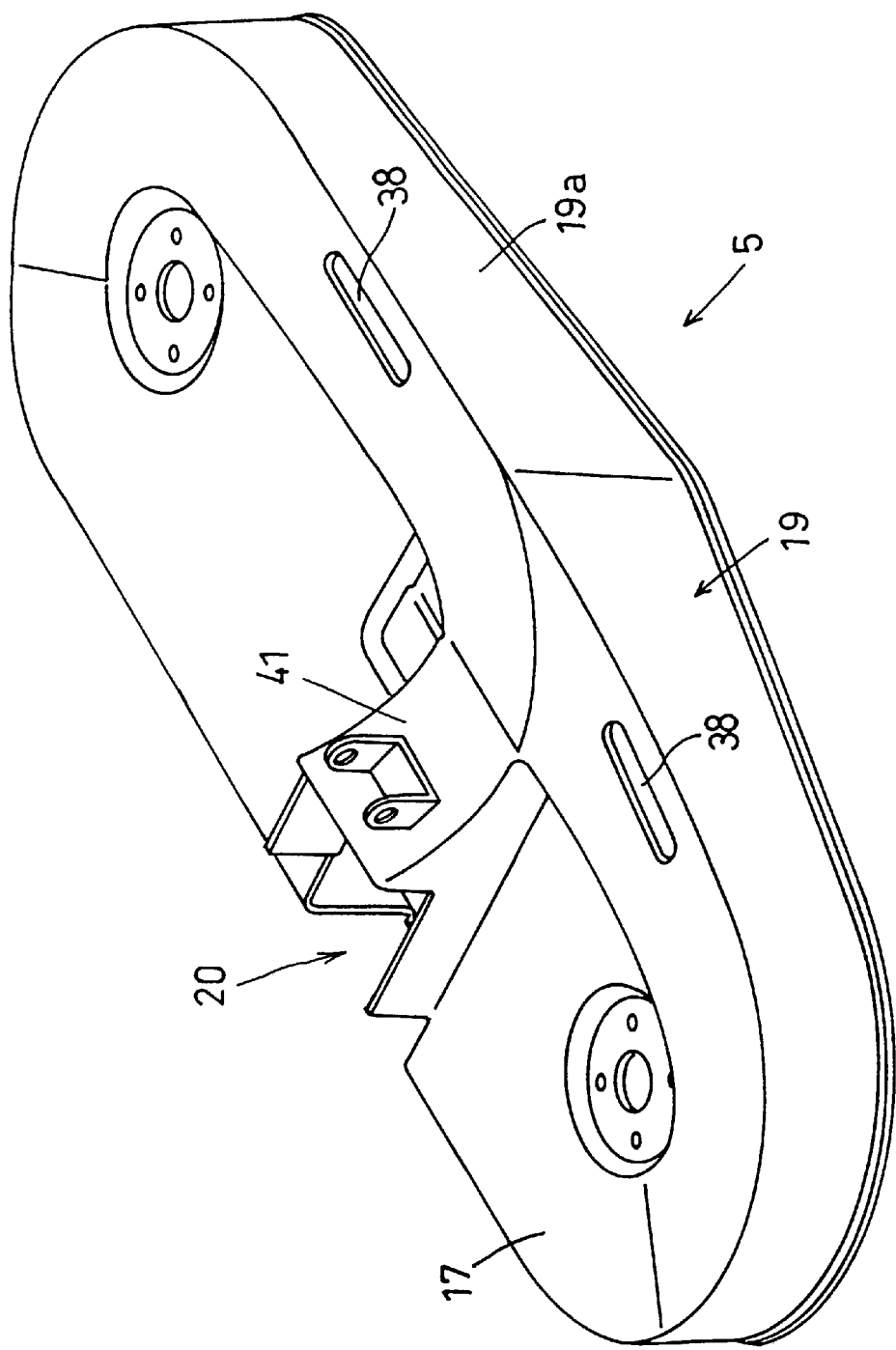
FIG. 10 is a perspective view of a deck.

As shown in FIGS. 8 and 9, the grass discharge passage 40 includes a movable front bottom plate 53 disposed in a lower position at the grass discharge opening 20. The movable front bottom plate 53 is vertically pivotable about a transverse pivotal axis X2 defined by the outer wall 19. A control lever 55 is connected to the movable front bottom plate 53 through a link mechanism 54. A fore and aft swing of the control lever 55 causes the front movable bottom plate 53 to pivot vertically about the transverse pivotal axis X2 between an inclined position extending rearward and downward and an inclined position extending rearward and upward. When the control lever 55 is inoperative, the movable front bottom plate 53 is maintained by gravity in the inclined position extending rearward and upward and resting on a stopper 56.

Any grass clippings adhering to the movable front bottom plate 53 may easily be released therefrom by swinging the control lever 55 to vibrate the movable front bottom plate 53. Thus, the grass clippings may be transported efficiently toward the grass catcher 6.

The rear duct 44 includes a forward portion extending from the arch peak to the front duct 43 and having a square sectional shape, and a rearward portion extending from the arch peak to the grass catcher 6 and having a channel shape opening downward. A movable rear bottom plate 57 is disposed in the bottom opening between the arch peak and grass catcher 6. The movable rear bottom plate 57 is connected to a bottom rear end of rear duct 44 to be vertically pivotable about a transverse pivotal axis X3. A control lever 59 is connected to the movable rear bottom plate 57 through a bracket 58. A vertical movement of the control lever 59 causes the rear movable bottom plate 57 to pivot vertically about the transverse pivotal axis X3 between a position closing the bottom opening of the rear duct 44 and a position inside the rear duct 44. When the control lever 59 is inoperative, the movable rear bottom plate 57 is maintained by gravity in the position closing the bottom opening of the rear duct 44.

Any grass clippings adhering to the movable rear bottom plate 57 may easily be released therefrom by swinging the control lever 59 to vibrate the movable rear bottom plate 57. Thus, the grass clippings may be transported efficiently toward the grass catcher 6.

Figure 13:
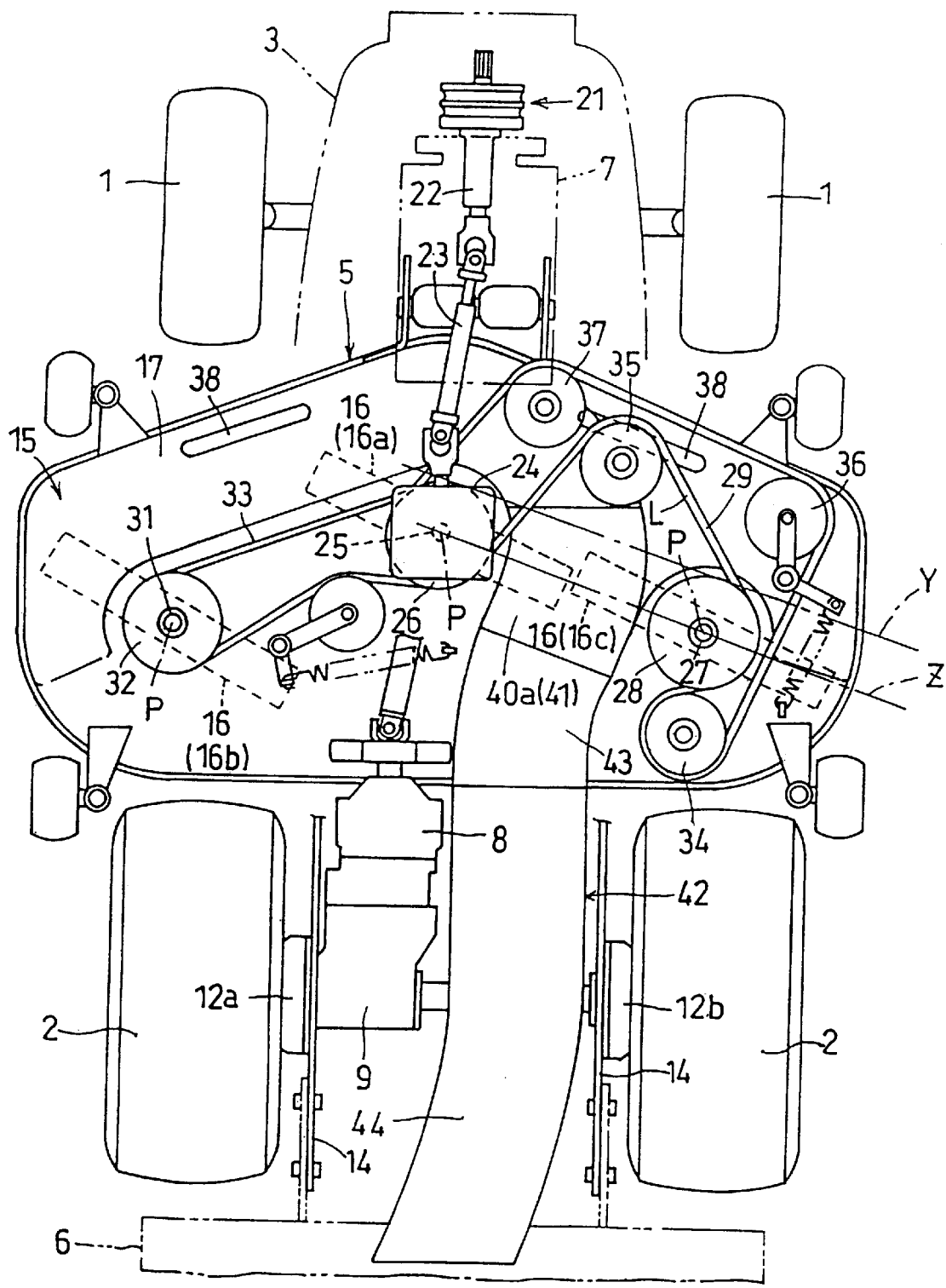
FIG. 13 is a plan view of a principal portion of a grass cutting machine in a second embodiment.
Figure 14:
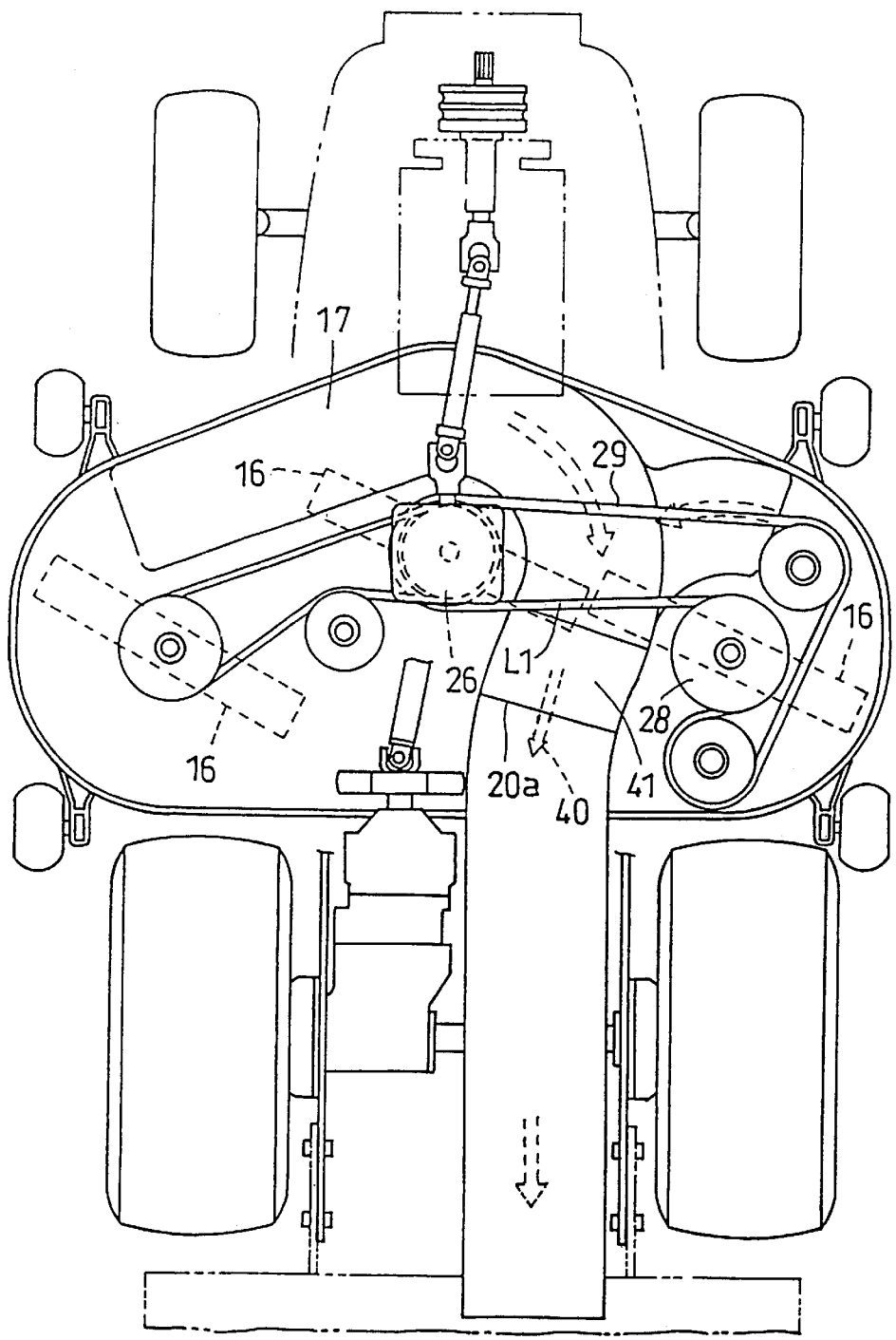
FIG. 14 is a plan view of a conventional mower unit.
Figure 15:
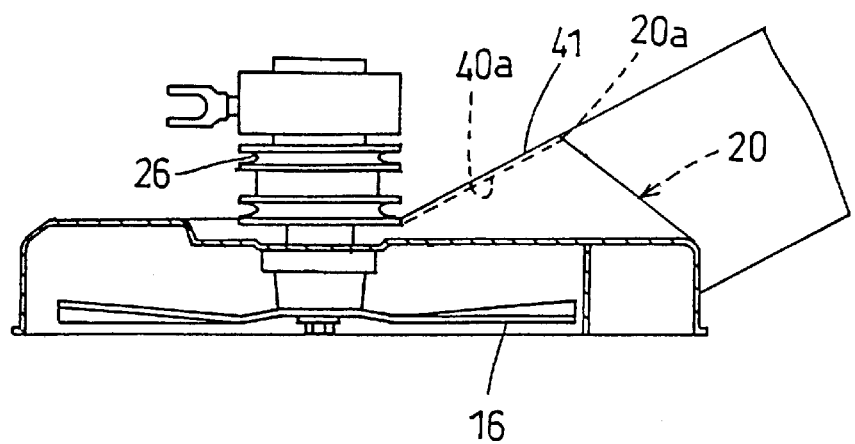
FIG. 15 is a side view in vertical section of the conventional mower unit.

FIG. 13 shows a modification of the embodiment described above. The rear duct 44 here has a portion thereof disposed rearwardly of the transmission case 9, which, in plan view. is curved toward the transversely intermediate portion of the wall 49 closing the front opening of the grass catcher 6. The rear end of rear duct 44 projects into the transversely intermediate portion of the wall 49.

The grass clippings guided by the rear duct 44 are discharged from the transversely intermediate portion of the wall 49 closing the front opening of the grass catcher 6. The grass clippings are thereby collected as distributed evenly in the right and left direction in the grass catcher 6.

The other aspects are the same as in the first embodiment. Like reference numerals are used to identify like parts in the first embodiment and will not be described again.

This invention is applicable also to a grass cutting machine having a mower unit 5 vertically movably suspended through link mechanism 4, for example, from the front of a vehicle body 3 with front wheels 1 and rear wheels 2.

The number of rotary blades 16 is not limited to three, but may be two, four or more. The blade drive system is not limited to what is described in the foregoing embodiment.

A flat belt or a round belt may be employed as the endless rotational belt 29 wound around the first drive pulley 26 and right driven pulley 28.

The moving path of the endless rotational belt 29 may be varied as desired as long as the path portion L between the first drive pulley 26 and right driven pulley 28 is disposed forwardly of these pulleys 26 and 28.

What is claimed is:

1. A grass cutting machine comprising:
   an engine;
   a pair of front wheels;
   a pair of rear wheels, at least one of said pair of front wheels and said pair of rear wheels being driven by said engine; and
   a mower unit, said mower unit including:
      a central blade rotatable in one way in unison with a central pulley;
      a first side blade and a second side blade disposed on one side and the other side with respect to said central blade, respectively, said first side blade being rotatable by a first side pulley in a second direction contrary to said one direction, said second side blade being rotatable by a second side pulley in said one direction;
      an endless rotational belt for transmitting drive at least between said central pulley and said first side pulley;
      an offset member engaged with a portion L of said endless rotational belt extending between said central pulley and said first side pulley from behind in a fore and aft direction of the grass cutting machine, thereby to convex said portion L forwardly, in said fore and aft direction, of a phantom line Z extending between respective rotary shafts of said central pulley and said first side pulley; and
      a grass discharge passage extending from a position between said respective rotary shafts toward a further position between said rear wheels, wherein said grass discharge passage has its upper surface begin to incline upwardly from a space defined by said convexed portion and located forwardly of said phantom line Z.

2. A grass cutting machine comprising:
   an engine;
   a pair of front wheels;
   a pair of rear wheels, at least one of said pair of front wheels and said pair of rear wheels being driven by said engine; and
   a mower unit, said mower unit including:
      a first rotary shaft rotated with a drive transmitted from said engine;
      drive pulley and a first blade mounted on said first rotary shaft to be rotatable in unison with each other in one direction;
      a second rotary shaft standing adjacent to said first rotary shaft;
      a driven pulley and a second blade mounted on said second rotary shaft, said driven pulley and said second blade being rotatable in unison with each other, with the drive transmitted from said drive pulley, in a second direction contrary to said one direction;
      an endless rotational belt for transmitting the drive from said drive pulley to said driven pulley;
      an offset member engaged with a portion L of said endless rotational belt extending between said drive pulley and said driven pulley from behind in a fore and aft direction of the grass cutting machine, thereby to convex said portion L forwardly, in said fore and aft direction, of a phantom line Z extending between said first and second rotary shafts; and
      a grass discharge passage extending from a position centrally of said first and second rotary shafts toward a further position between said rear wheels, wherein said grass discharge passage has its upper surface begin to incline upwardly from a space defined by said convexed portion and located forwardly of said phantom line Z.

* * * * *